(12) United States Patent
Chen et al.

(10) Patent No.: US 11,048,119 B2
(45) Date of Patent: Jun. 29, 2021

(54) KEYBOARD DEVICE AND OPERATION METHOD THEREOF

(71) Applicants:LITE-ON ELECTRONICS (GUANGZHOU) LIMITED, Guangzhou (CN); Lite-On Technology Corporation, Taipei (TW)

(72) Inventors: Chun-Lin Chen, Taipei (TW); Chin-Fa Wu, Taipei (TW); Wen-Tong Liu, Taipei (TW); Er-Hao Chen, Taipei (TW); Ming-Fu Yen, Taipei (TW)

(73) Assignees: LITE-ON ELECTRONICS (GUANGZHOU) LIMITED, Guangzhou (CN); Lite-On Technology Corporation, Taipei (TW)

( * ) Notice: Subject to any disclaimer, the term of this patent is extended or adjusted under 35 U.S.C. 154(b) by 0 days.

(21) Appl. No.: 16/513,711

(22) Filed: Jul. 17, 2019

(65) Prior Publication Data

US 2020/0124915 A1 Apr. 23, 2020

(30) Foreign Application Priority Data

Oct. 17, 2018 (CN) .......................... 201811207487.5

(51) Int. Cl.
*H01H 13/83* (2006.01)
*G02F 1/13357* (2006.01)

(52) U.S. Cl.
CPC ....... *G02F 1/133603* (2013.01); *H01H 13/83* (2013.01); *H01H 2219/044* (2013.01); *H01H 2219/062* (2013.01); *H01H 2219/064* (2013.01); *H01H 2221/07* (2013.01)

(58) Field of Classification Search
CPC ....................................................... H01H 13/83
USPC ........................................................ 362/23.03
See application file for complete search history.

(56) References Cited

U.S. PATENT DOCUMENTS

| | | | |
|---|---|---|---|
| 7,531,764 B1* | 5/2009 | Lev ......................... | H01H 3/125 200/310 |
| 2012/0090969 A1* | 4/2012 | Chen ...................... | G06F 3/0202 200/314 |
| 2017/0003754 A1* | 1/2017 | Geary ................... | G06F 3/0202 |

FOREIGN PATENT DOCUMENTS

| | | |
|---|---|---|
| TW | 200910907 | 3/2009 |
| TW | M371263 | 12/2009 |
| TW | 201032252 | 9/2010 |
| TW | 201203079 | 1/2012 |
| TW | 201230107 | 7/2012 |
| TW | 201330582 | 7/2013 |

(Continued)

*Primary Examiner* — Sean P Gramling
(74) *Attorney, Agent, or Firm* — JCIPRNET (57) ABSTRACT

A keyboard device and an operating method thereof are provided. The keyboard device includes a microcontroller, a drive circuit, a backlight module, and a plurality of key units. The microcontroller is coupled to a computer device. A detection module of the computer device detects an input mode of the computer device. The plurality of key units is disposed on the backlight module. The plurality of key units each has a plurality of character symbols corresponding to different input modes. The microcontroller outputs a control signal to the drive circuit according to the input mode. The drive circuit drives the backlight module according to the control signal to selectively illuminate one of the plurality of character symbols of each of at least a portion of the plurality of key units.

12 Claims, 7 Drawing Sheets

(56) References Cited

FOREIGN PATENT DOCUMENTS

| TW | 201435660 | 9/2014 |
| TW | 201512904 | 4/2015 |
| TW | 201512972 | 4/2015 |
| TW | 201525774 | 7/2015 |
| TW | 201640298 | 11/2016 |

\* cited by examiner

KEYBOARD DEVICE AND OPERATION METHOD THEREOF

CROSS-REFERENCE TO RELATED APPLICATION

This application claims the priority benefit of China application serial no. 201811207487.5, filed on Oct. 17, 2018. The entirety of the above-mentioned patent application is hereby incorporated by reference herein and made a part of this specification.

BACKGROUND OF THE INVENTION

1. Field of the Invention

The present invention generally relates to an input device, and in particular to a keyboard device and an operation method thereof.

2. Description of Related Art

In general, a conventional keyboard device having a light emitting function illuminates each key unit of the entire keyboard device through a backlight module. However, the light emitting effect of the conventional keyboard device has failed to meet a current visual feedback requirement of a user for the use of the keyboard device. Therefore, to solve the problem of how to allow the keyboard device to provide a more diversified visual feedback effect and good user experience, solutions of several embodiments will be described below.

SUMMARY OF THE INVENTION

The present invention provides a keyboard device and an operation method thereof are capable of providing a diversified character symbol illumination effect.

The keyboard device of the present invention includes a microcontroller, a drive circuit, a backlight module and a plurality of key units. The microcontroller is coupled to a computer device. A detection module of the computer device detects an input mode of the computer device. The drive circuit is coupled to the microcontroller. The backlight module is coupled to the drive circuit. The plurality of key units is disposed on the backlight module. Each of the plurality of key units includes a plurality of character symbols corresponding to different input modes. The microcontroller outputs a control signal to the drive circuit according to the input mode. The drive circuit drives the backlight module according to the control signal to selectively illuminate one of the plurality of character symbols of each of at least a portion of the plurality of key units.

In one embodiment of the present invention, each of the plurality of key units includes a key cap. The key cap includes a plurality of light transparent areas. The plurality of light transparent areas correspond to the plurality of character symbols.

In one embodiment of the present invention, the backlight module includes a plurality of light emitting components. The plurality of light emitting components are disposed on the backlight module. The plurality of light emitting components is respectively located below the plurality of key caps of the plurality of key units. The plurality of light emitting components are one-to-one corresponded to the plurality of character symbols. The microcontroller controls the drive circuit according to the input mode to drive one of the plurality of light emitting components of each of at least a portion of the plurality of key units.

In one embodiment of the present invention, the backlight module is a direct backlight module. The each of the plurality of key units further includes a support. The support is disposed between the each of the key caps of the plurality of key units and the backlight module. The plurality of light emitting components are one-to-one disposed under the plurality of character symbols of the plurality of key units respectively.

In one embodiment of the present invention, the plurality of light emitting components of each of the plurality of key units are configured to respectively provide a plurality of illumination lights with different colors.

In one embodiment of the present invention, the backlight module further includes a membrane circuit board and a membrane layer. The plurality of light emitting components are disposed on the membrane circuit board or the membrane layer, so that the plurality of light emitting components are coupled to the microcontroller by the membrane circuit board or the membrane layer.

In one embodiment of the present invention, the backlight module further includes a circuit protective layer. The circuit protective layer is formed on the membrane circuit board or the membrane layer, and the circuit protective layer covers the plurality of light emitting components.

In one embodiment of the present invention, the backlight module further includes a masking layer. The masking layer is formed on at least a portion of the circuit protective layer.

In one embodiment of the present invention, the backlight module further includes a base plate. The base plate is disposed on a bottommost layer of the backlight module, disposed on the circuit protective layer, or disposed on the masking layer further included in the backlight module.

An operation method of the keyboard device of the present invention includes the following steps: detecting, by a detection module of a computer device, an input mode of the computer device when the keyboard device is coupled to the computer device, outputting, by a microcontroller of the keyboard device, a control signal to a drive circuit of the keyboard device according to the input mode, and driving, by the drive circuit, a backlight module of the keyboard device according to the control signal to selectively illuminate one of a plurality of character symbols of each of at least a portion of a plurality of key units of the keyboard device.

Based on the above, the keyboard device and the operation method thereof of the present invention may selectively illuminate specific character symbols on at least a portion of the plurality of key units of the keyboard device according to the input mode currently operated in the computer device so as to provide the diversified character symbol illumination effect.

To make the above described features and advantages of the present invention clearer, the embodiments are hereinafter specified and are described below in detail in combination with accompanying drawings.

DESCRIPTION OF THE EMBODIMENTS

To make the content of the present invention easier to understand, the embodiments are hereinafter specified as examples that can be implemented by the present invention. In addition, wherever possible, the elements/components/steps which use the same label in the drawings and implementation modes refer to the same or similar components.

Figure 1:
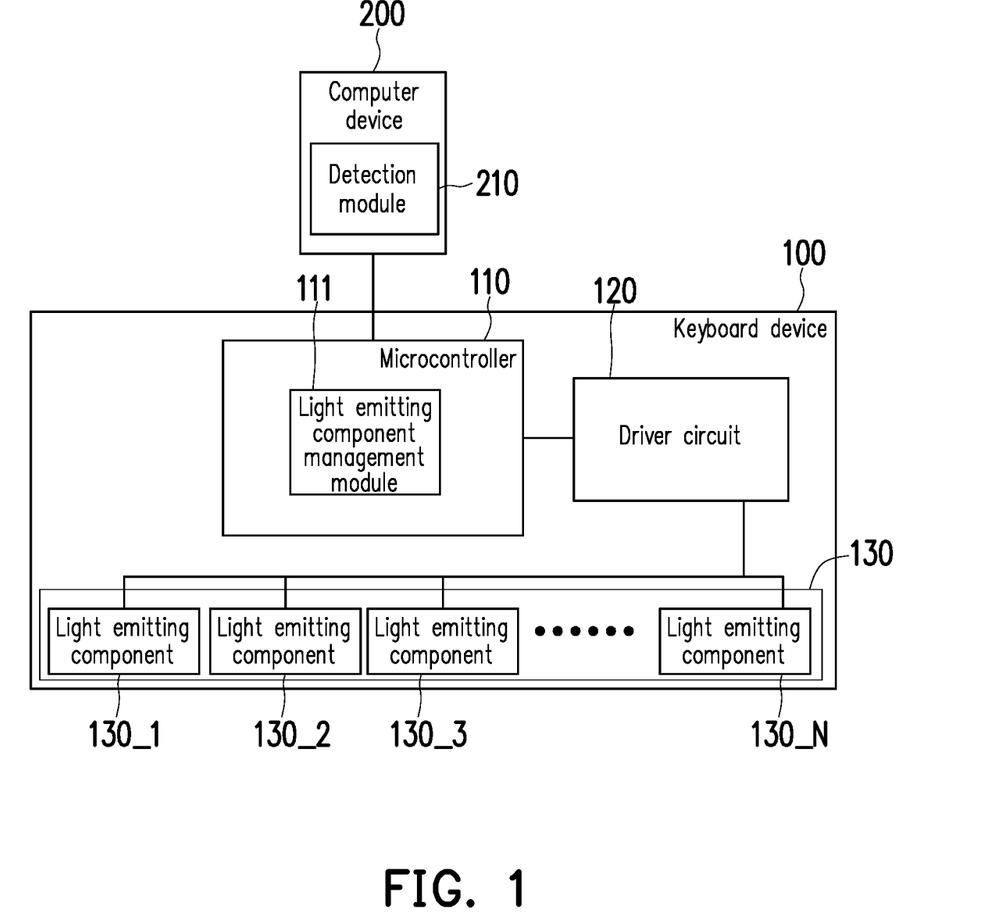
FIG. 1 is a functional circuit diagram of a keyboard device according to one embodiment of the present invention.

FIG. 1 is a functional circuit diagram of a keyboard device according to one embodiment of the present invention. Referring to FIG. 1, the keyboard device 100 includes a microcontroller 110, a drive circuit 120 and a backlight module 130. The microcontroller 110 is coupled to the drive circuit 120, and the drive circuit 120 is coupled to the backlight module 130. The microcontroller 110 may execute a light emitting component management module 111. A computer device 200 includes a detection module 210. The backlight module 130 includes a plurality of light emitting components 130_1 to 130_N, where N is a positive integer more than 0. In the present embodiment, the light emitting components 130_1 to 130_N may be classified into a plurality of groups to respectively correspond to a plurality of key units of the keyboard device 100. Moreover, in the present embodiment, when the keyboard device 100 is coupled to the computer device 200, the computer device 200 may execute the detection module 210 to detect an input mode currently operated in the computer device 200. Moreover, the microcontroller 110 may generate a corresponding control signal to the drive circuit 120 by the light emitting component management module 111 according to the input mode currently operated in the computer device 200, such that the drive circuit 120 may selectively drive the light emitting components 130_1 to 130_N. In other embodiments, a user also may directly send a control command to the light emitting component management module 111 by a function key with a specific combination to select corresponding backlight.

The microcontroller 110 may include a central processing unit (CPU) having a data processing function, or other programmable microprocessors having general uses or special uses, a digital signal processor (DSP), a programmable controller, application specific integrated circuits (ASIC), a programmable logic device (PLD), other similar processing devices or a combination of the devices. In the present embodiment, the keyboard device 100 or the microcontroller 110 may further include a memory, and the light emitting component management module 111 may be written into the memory in the form of software (or firmware) for the microcontroller 110 to read and execute. In addition, the computer device 200 may also include a memory, and the detection module 210 may be written into the memory of the computer device 200 in the form of software (or firmware) for the computer device 200 to read and execute.

The light emitting components 130_1 to 130_N may be micro light emitting diodes (Micro LEDs), and each of the key units of the keyboard device 100 may include a plurality of micro light emitting diodes. However, the present invention is not limited to the micro light emitting diodes. In one embodiment, the light emitting components 130_1 to 130_N may also be light emitting components such as light emitting diodes (LEDs), mini light emitting diodes (Mini LEDs) or organic light emitting diodes (OLEDs).

In the present embodiment, the plurality of micro light emitting diodes in the single key unit are one-to-one corresponded to a plurality of different character symbols, and the micro light emitting diodes may be selectively driven according to the input mode currently operated in the computer device 200 to selectively illuminate the different character symbols. It should be noted that the micro light emitting diodes may be used to provide illumination light of different colors, and the drive circuit 120 may include a plurality of light emitting diode drivers to provide different driving voltages to the micro light emitting diodes, but the present invention is not limited thereto. In one embodiment, the micro light emitting diodes may also be used to provide illumination light of the same color.

Figure 2A:
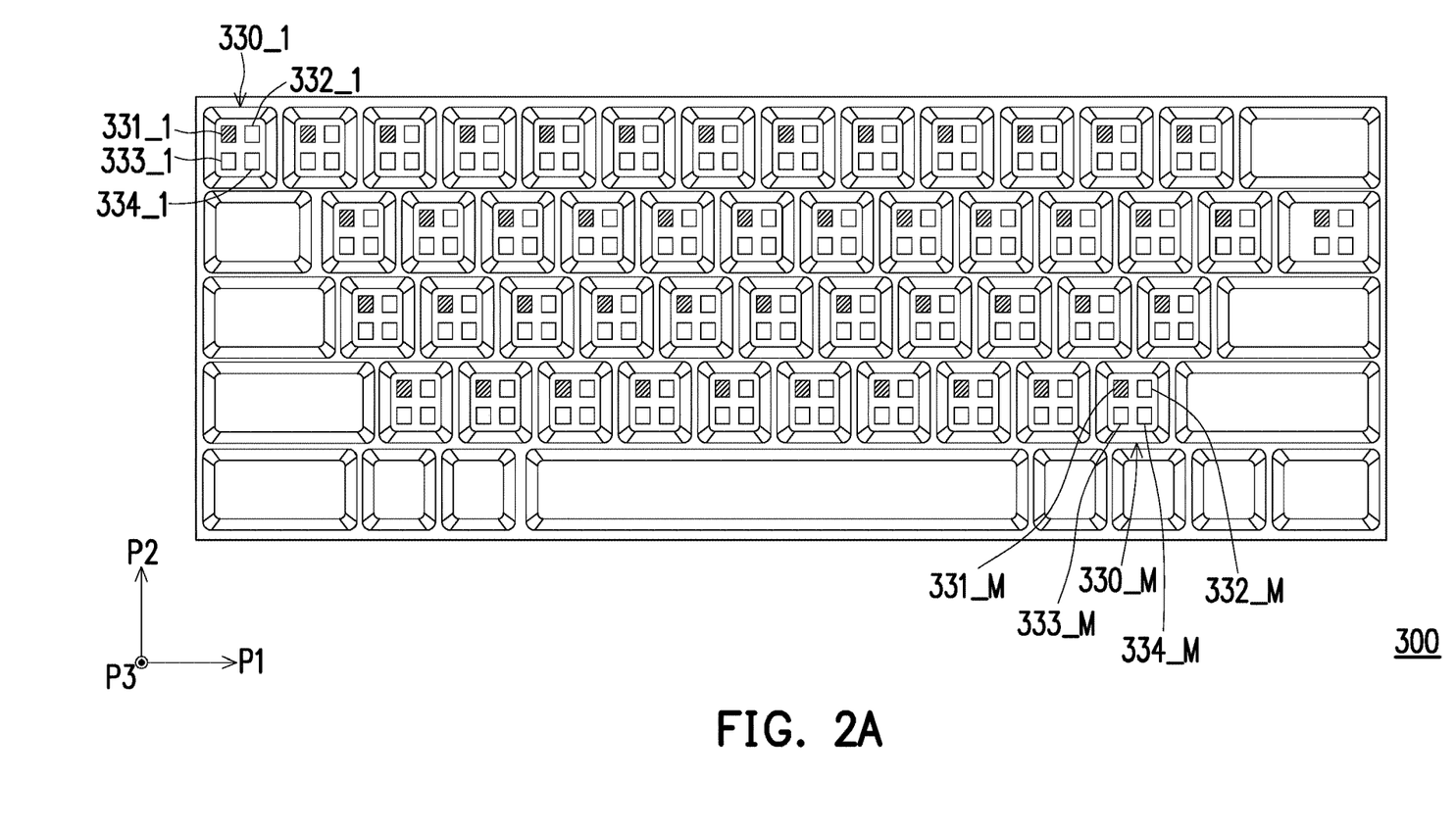
FIGS. 2A and 2B are respective schematic diagrams of illumination of character symbols according to one embodiment of the present invention.
Figure 2B:
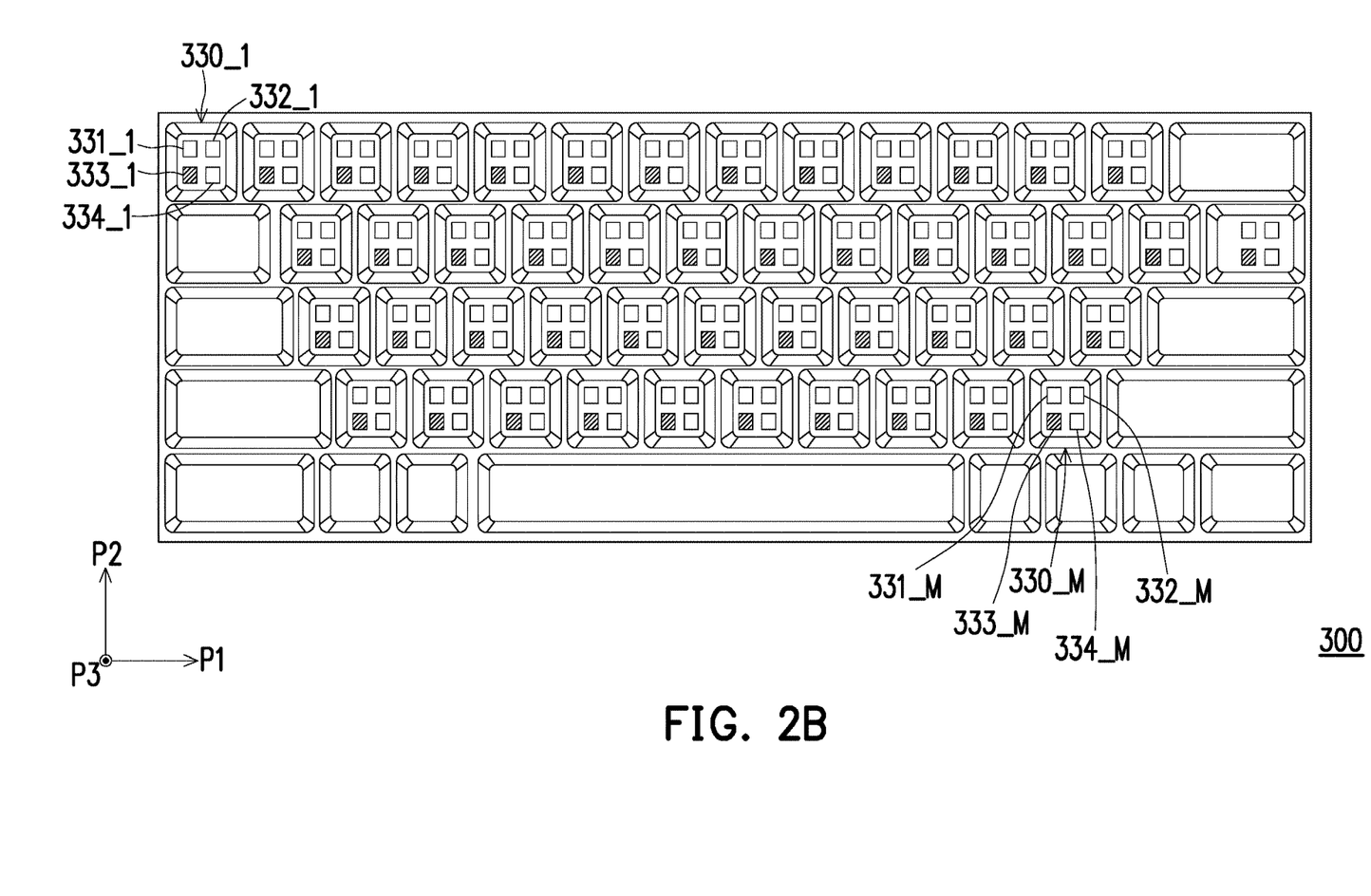
Figure 3:
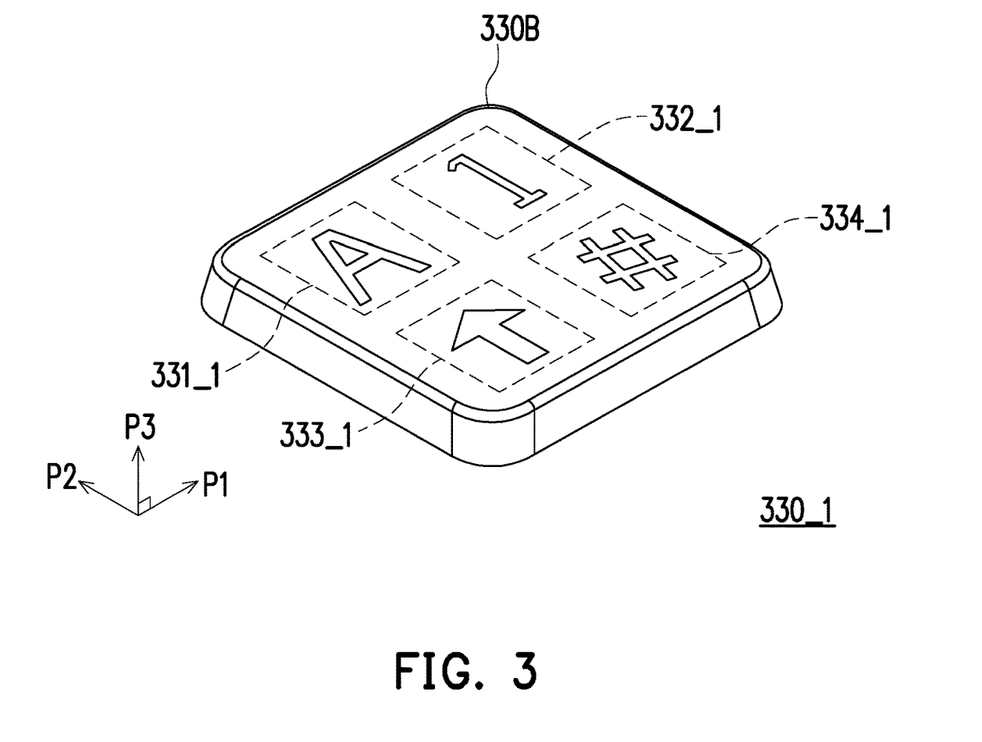
FIG. 3 is a schematic diagram of key units according to the embodiments in FIGS. 2A and 2B.

FIGS. 2A and 2B are respective schematic diagrams of illumination of character symbols according to one embodiment of the present invention. FIG. 3 is a schematic diagram of key units according to the embodiments in FIGS. 2A and 2B. Referring to FIGS. 2A and 2B, in the present embodiment, the keyboard device 300 may include a plurality of key units 330_1 to 330_M disposed in an array on a plane formed along a first direction P1 and a second direction P2, where M is a positive integer more than 0. The first direction P1, the second direction P2 and a third direction P3 are perpendicular to one another. In the present embodiment, each of the key units 330_1 to 330_M may include a plurality of light transparent areas 331_1 to 331_M, 332_1 to 332_M, 333_1 to 333_M and 334_1 to 334_M corresponding to various input modes, and the light transparent areas 331_1 to 331_M, 332_1 to 332_M, 333_1 to 333_M and 334_1 to 334_M may correspond to character symbols (such as English character symbols, numeric character symbols or pinyin character symbols) of different input methods or different types of character symbols (such as direction character symbols or special character symbols).

Referring to FIG. 3, the key unit 330_1 is taken as an example. The key unit 330_1 includes a key cap 330B. The top surface of the key cap 330B may include a plurality of light transparent areas 331_1 to 334_1, and the light transparent areas 331_1 to 334_1 correspond to a plurality of character symbols. For example, in the present embodiment, the light transparent area 331_1 may correspond to the English character symbols, the light transparent area 332_1 may correspond to the numeric character symbols, the light transparent area 333_1 may correspond to the direction character symbols, and the light transparent area 334_1 may correspond to the special symbol characters, but the present invention is not limited thereto. In one embodiment, the light transparent areas 331_1 to 334_1 may respectively correspond to characters of an English input method, characters of a pinyin input method, characters of a Cangjie input method and characters of a Daqian Dayi input method.

Referring again to FIGS. 2A and 2B, in the present embodiment, each of the light transparent areas 331_1 to 331_M, 332_1 to 332_M, 333_1 to 333_M and 334_1 to 334_M corresponds to one light emitting component. For example, the light transparent area 331_1 corresponds to the light emitting component 130_1 shown in FIG. 1, the light transparent area 332_1 corresponds to the light emitting component 130_2 shown in FIG. 1, and the light transparent area 333_1 corresponds to the light emitting component 130_3 shown in FIG. 1, and the rest can be done in the same manner. In other words, the character symbols respectively corresponding to each of the light transparent areas 331_1 to 331_M, 332_1 to 332_M, 333_1 to 333_M and 334_1 to 334_M of the key units 330_1 to 330_M have the characteristic of being illuminated separately.

For example, the light transparent areas 331_1 to 331_M of the key units 330_1 to 330_M may correspond to the English input method, the light transparent areas 332_1 to 332_M may correspond to a numeric input method, the light transparent areas 333_1 to 333_M may correspond to a directional instruction input method, and the light transparent areas 334_1 to 334_M may correspond to a special symbol input method. Firstly, as shown in FIG. 2A, when the keyboard device 300 is coupled to the computer device, and the keyboard device 300 detects that the input mode currently operated in the computer device is the English input method, the keyboard device 300 may correspondingly drive the plurality of light emitting components corresponding to the light transparent areas 331_1 to 331_M to illuminate the English character symbols on the key units 330_1 to 330_M without illuminating other character symbols on other light transparent areas 332_1 to 332_M, 333_1 to 333_M and 334_1 to 334_M. Then, as shown in FIG. 2B, when a user switches the input mode currently operated in the computer device into the special instruction input method, the keyboard device 300 may correspondingly drive the plurality of light emitting components corresponding to the light transparent areas 333_1 to 333_M to illuminate the direction character symbols on the key units 330_1 to 330_M without illuminating other character symbols on other light transparent areas 331_1 to 331_M, 332_1 to 332_M and 334_1 to 334_M. In other words, the keyboard device 300 of the present embodiment may selectively illuminate the special character symbols on at least a portion of the key units 330_1 to 330_M of the keyboard device 300 according to the input mode currently operated in the computer device to emphasize a usage situation of the input mode currently operated in the computer device.

Figure 4:
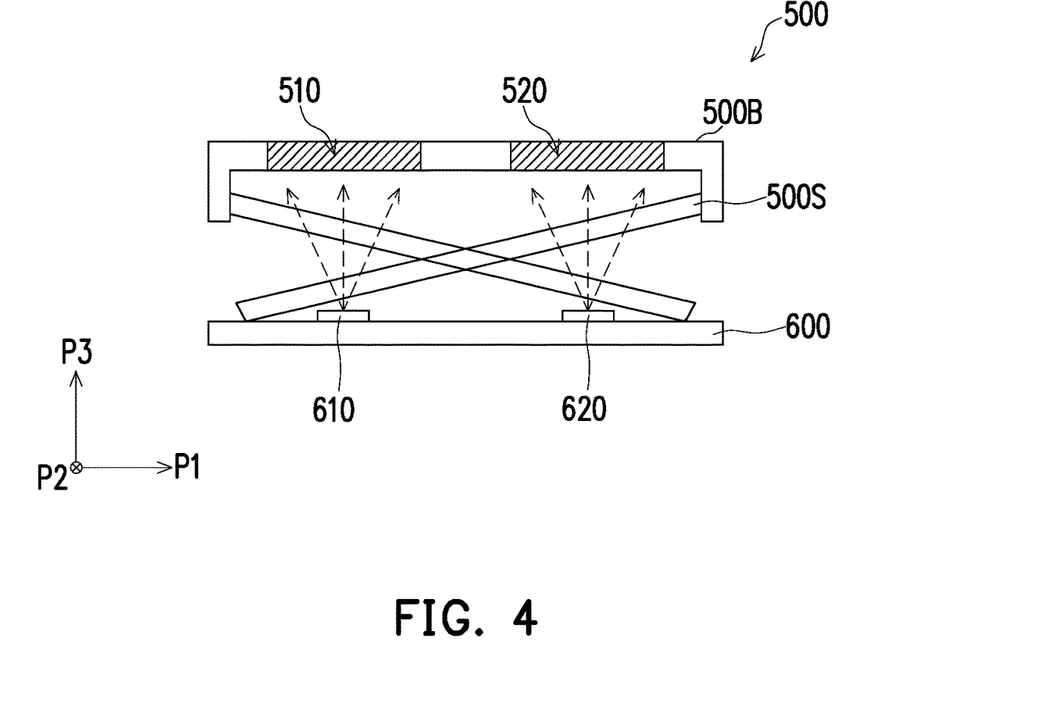
FIG. 4 is a schematic structural diagram of a key unit according to one embodiment of the present invention.

FIG. 4 is a schematic structural diagram of a key unit according to one embodiment of the present invention. Referring to FIG. 4, the backlight module according to various embodiments of the present invention may be a direct backlight module, and thus the structure of the key unit may be shown in FIG. 4. In the present embodiment, the key unit 500 may include a key cap 500B and a support 500S. The key cap 500B includes a plurality of light transparent areas 510, 520, and each of the light transparent areas 510, 520 may include character symbols corresponding to different input methods. In the present embodiment, the backlight module 600 includes light emitting components 610, 620, and the light emitting components 610, 620 are one-to-one disposed under the light transparent areas 510, 520 of the key unit 500 respectively. The illumination directions of the light emitting components 610, 620 are opposite to the light transparent areas 510, 520 and selectively provide illumination light to the light transparent areas 510, 520. Moreover, in the present embodiment, the light emitting components 610, 620 may provide illumination light of different colors or the same color, and the present invention is not limited thereto.

Moreover, the support 500S of the key unit 500 is disposed on the backlight module 600 and provides an elastic force. The support 500S may be, for example, a scissor-mechanism. For example, when a finger of the user presses the key cap 500B of the key unit 500, the kay cap 500B of the key unit 500 may be moved in the third direction P3 according to the pressure. Furthermore, when the finger of the user leaves the kay cap 500B of the key unit 500, the support 500S of the key unit 500 may provide the elastic force to allow the key cap 500B of the key unit 500 to return to the original position.

Figure 5A:
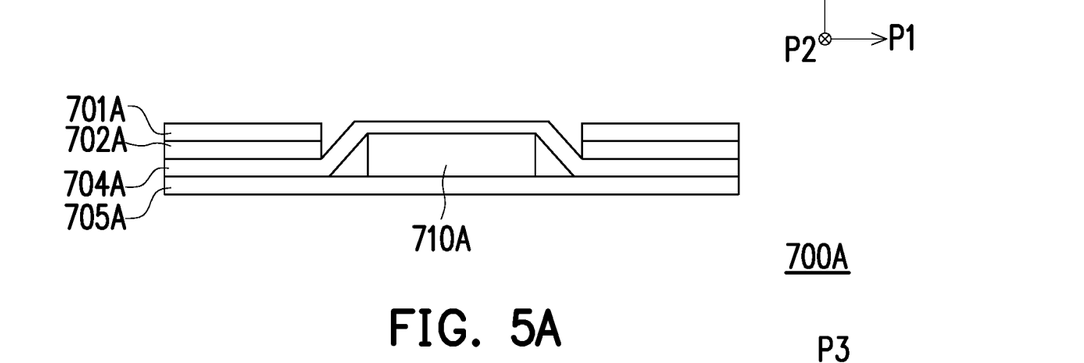
FIGS. 5A to 5D are schematic structural diagrams of various backlight modules according to one embodiment of the present invention.

FIGS. 5A to 5D are schematic structural diagrams of various backlight modules according to one embodiment of the present invention. Referring to FIG. 5A, in one embodiment, the backlight module 700A may include a light emitting component 710A, a membrane layer 701A, a base plate 702A, a circuit protective layer 704A and a membrane circuit board 705A. In the present embodiment, the backlight module 700A is formed by sequentially stacking the membrane layer 701A, the base plate 702A, the circuit protective layer 704A and the membrane circuit board 705A, and the light emitting component 710A is disposed on the membrane circuit board 705A and is thus coupled to the drive circuit 120 and the microcontroller 110 in FIG. 1 by the membrane circuit board 705A. In addition, the light emitting component 710A and the circuit protective layer 704A are exposed from the membrane layer 701A and the base plate 702A. The circuit protective layer 704A may be made of a material having a light transparent characteristic.

Figure 5B:
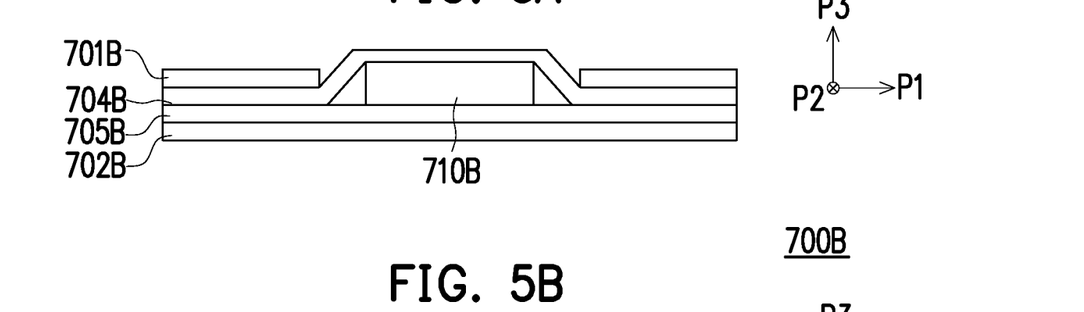

Referring to FIG. 5B, in one embodiment, the backlight module 700B may include a light emitting component 710B, a membrane layer 701B, a base plate 702B, a circuit protective layer 704B and a membrane circuit board 705B. In the present embodiment, the backlight module 700B is formed by sequentially stacking the membrane layer 701B, the circuit protective layer 704B, the membrane circuit board 705B and the base plate 702B, and the light emitting component 710B is disposed on the membrane circuit board 705B and is thus coupled to the drive circuit 120 and the microcontroller 110 in FIG. 1 by the membrane circuit board 705B. In addition, the light emitting component 710B and the circuit protective layer 704B are exposed from the membrane layer 701B, and the circuit protective layer 704B may be made of a material having a light transparent characteristic.

Figure 5C:
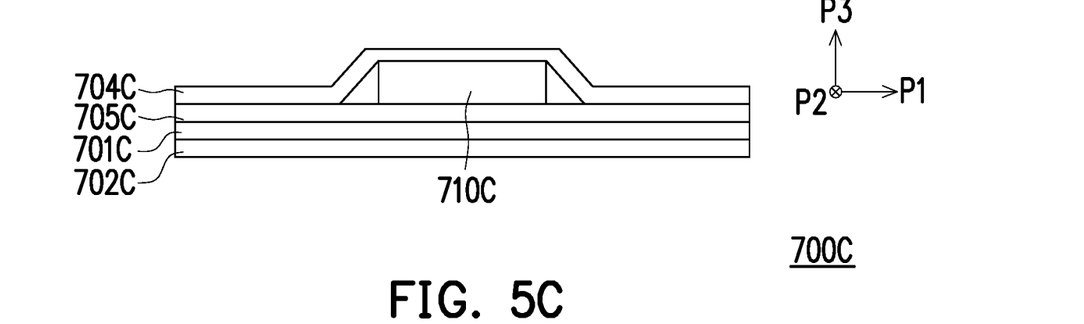

Referring to FIG. 5C, in one embodiment, the backlight module 700C may include a light emitting component 710C, a membrane layer 701C, a base plate 702C, a circuit protective layer 704C and a membrane circuit board 705C. In the present embodiment, the backlight module 700C is formed by sequentially stacking the circuit protective layer 704C, the membrane circuit board 705C, the membrane layer 701C and the base plate 702C, and the light emitting component 710C is disposed on the membrane circuit board 705C and is thus coupled to the drive circuit 120 and the microcontroller 110 in FIG. 1 by the membrane circuit board 705C. In addition, the light emitting component 710C and the circuit protective layer 704C are located on the uppermost layer of the backlight module 700C, and the circuit protective layer 704C may be made of a material having a light transparent characteristic.

Figure 5D:
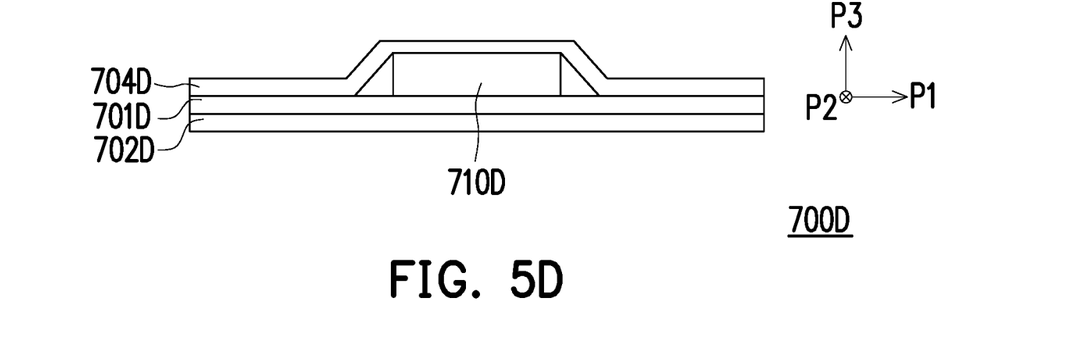

Referring to FIG. 5D, in one embodiment, the backlight module 700D may include a light emitting component 710D, a membrane layer 701D, a base plate 702D and a circuit protective layer 704D. In the present embodiment, the backlight module 700D is formed by sequentially stacking the circuit protective layer 704D, the membrane layer 701D and the base plate 702D, and the light emitting component 710D is disposed on the membrane layer 701D and is thus coupled to the drive circuit 120 and the microcontroller 110 in FIG. 1 by the membrane layer 701D. In addition, the light emitting component 710D and the circuit protective layer 704D are located on the uppermost layer of the backlight module 700D, and the circuit protective layer 704D may be made of a material having a light transparent characteristic.

FIGS. 6A to 6D are schematic structural diagrams of various backlight modules according to another embodiment of the present invention. It should be noted that compared with various backlight modules 700A to 700D of the aforementioned embodiments of FIGS. 5A to 5D, the backlight modules 700E to 700H of the present embodiment respectively further include masking layers 703E to 703H. In the present embodiment, the masking layers 703E to 703H disposed in the backlight modules 700E to 700H may be used to effectively mask lateral light of the light emitting components 710E to 710H to prevent the lateral light from illuminating the characters that should not be illuminated.

Figure 6A:
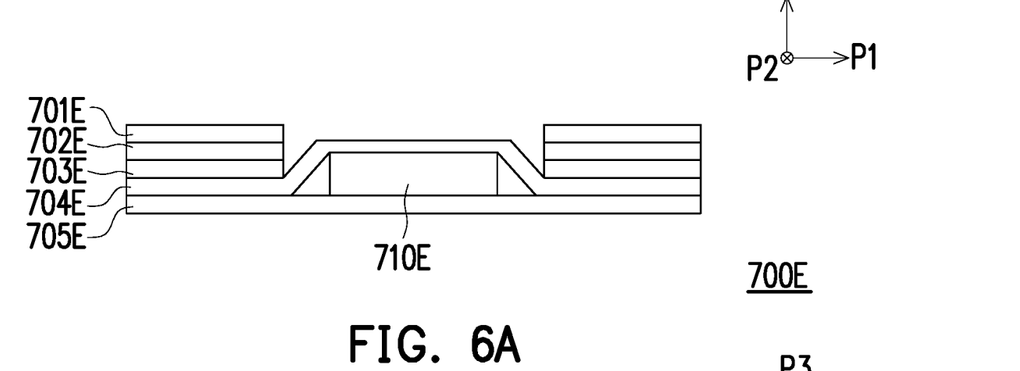
FIGS. 6A to 6D are schematic structural diagrams of various backlight modules according to another embodiment of the present invention.

Referring to FIG. 6A, in one embodiment, the backlight module 700E may include a light emitting component 710E, a membrane layer 701E, a base plate 702E, a masking layer 703E, a circuit protective layer 704E and a membrane circuit board 705E. In the present embodiment, the backlight module 700E is formed by sequentially stacking the membrane layer 701E, the base plate 702E, the masking layer 703E, the circuit protective layer 704E and the membrane circuit board 705E, and the light emitting component 710E is disposed on the membrane circuit board 705E and is thus coupled to the drive circuit 120 and the microcontroller 110 in FIG. 1 by the membrane circuit board 705E. In addition, the light emitting component 710E and the circuit protective layer 704E are exposed from the membrane layer 701E, the base plate 702E and the masking layer 703E, and the circuit protective layer 704E may be made of a material having a light transparent characteristic.

Figure 6B:
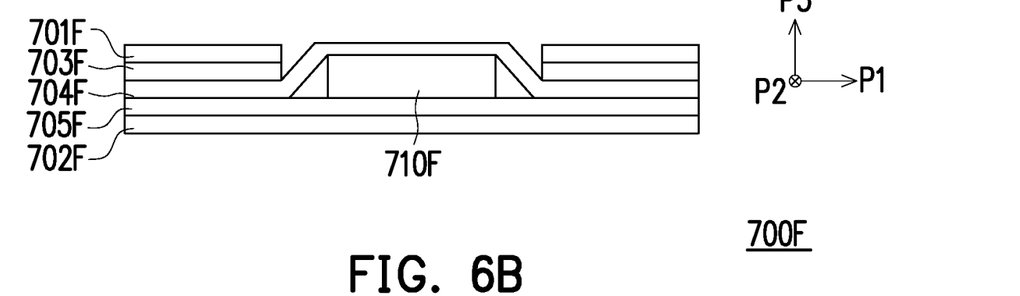

Referring to FIG. 6B, in one embodiment, the backlight module 700F may include a light emitting component 710F, a membrane layer 701F, a base plate 702F, a masking layer 703F, a circuit protective layer 704F and a membrane circuit board 705F. In the present embodiment, the backlight module 700F is formed by sequentially stacking the membrane layer 701F, the masking layer 703F, the circuit protective layer 704F, the membrane circuit board 705F and the base plate 702F, and the light emitting component 710F is disposed on the membrane circuit board 705F and is thus coupled to the drive circuit 120 and the microcontroller 110 in FIG. 1 by the membrane circuit board 705F. In addition, the light emitting component 710F and the circuit protective layer 704F are exposed from the membrane layer 701F and the masking layer 703F, and the circuit protective layer 704F may be made of a material having a light transparent characteristic.

Figure 6C:
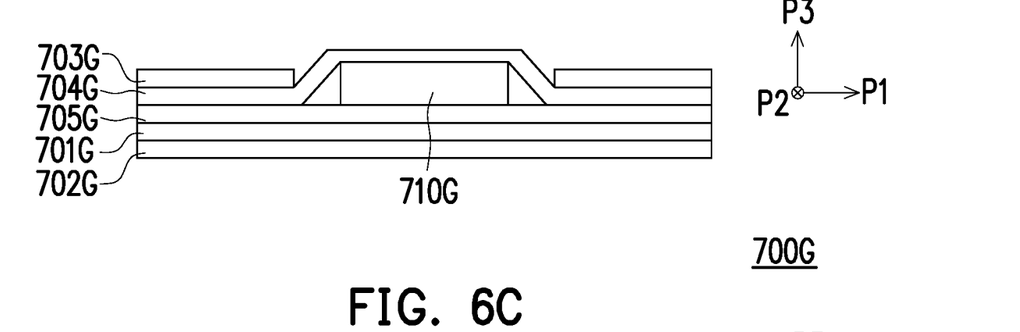

Referring to FIG. 6C, in one embodiment, the backlight module 700G may include a light emitting component 710G, a membrane layer 701G, a base plate 702G, a masking layer 703G, a circuit protective layer 704G and a membrane circuit board 705G. In the present embodiment, the backlight module 700G is formed by sequentially stacking the masking layer 703G, the circuit protective layer 704G, the membrane circuit board 705G, the membrane layer 701G and the base plate 702G, and the light emitting component 710G is disposed on the membrane circuit board 705G and is thus coupled to the drive circuit 120 and the microcontroller 110 in FIG. 1 by the membrane circuit board 705G. In addition, the light emitting component 710G and the circuit protective layer 704G are exposed from the masking layer 703G, and the circuit protective layer 704G may be made of a material having a light transparent characteristic.

Figure 6D:
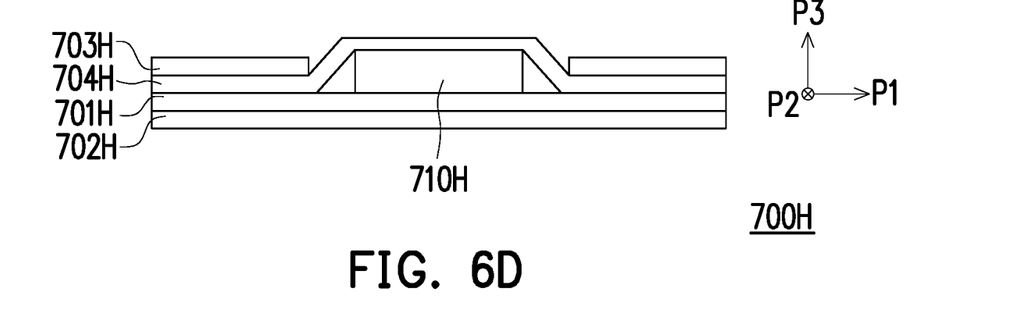

Referring to FIG. 6D, in one embodiment, the backlight module 700H may include a light emitting component 710H, a membrane layer 701H, a base plate 702H, a masking layer 703H and a circuit protective layer 704H. In the present embodiment, the backlight module 700H is formed by sequentially stacking the masking layer 703H, the circuit protective layer 704H, the membrane layer 701H and the base plate 702H, and the light emitting component 710H is disposed on the membrane layer 701H and is thus coupled to the drive circuit 120 and the microcontroller 110 in FIG. 1 by the membrane layer 701H. In addition, the light emitting component 710H and the circuit protective layer 704H are exposed from the masking layer 703H, and the circuit protective layer 704H may be made of a material having a light transparent characteristic.

Figure 7:
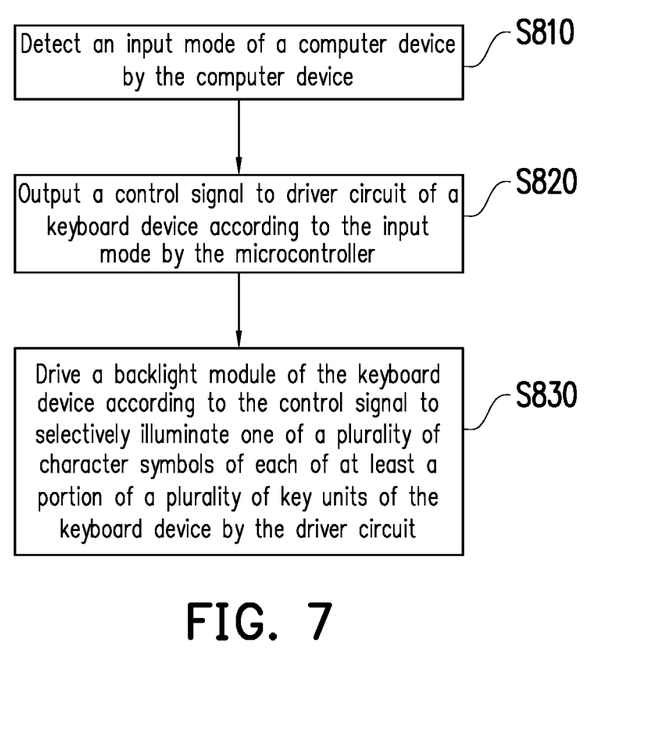
FIG. 7 is a flow diagram of an operation method of a keyboard device according to one embodiment of the present invention.

FIG. 7 is a flow diagram of an operation method of a keyboard device according to one embodiment of the present invention. Referring to FIGS. 1 and 7, the operation flow of the present embodiment may be at least suitable for the keyboard device 100 of the embodiment in FIG. 1. In the present embodiment, the keyboard device 100 is suitable for being coupled to a computer device 200 and executes the following steps S810 to S830. In Step S810, when the keyboard device 100 is coupled to the computer device 200, a detection module 210 of the computer device 200 detects an input mode of the computer device 200. In Step 820, a microcontroller 110 outputs a control signal to a drive circuit 120 of the keyboard device 100 according to the input mode of the computer device 200. In Step 830, the drive circuit 120 drives a backlight module 130 of the keyboard device 100 according to the control signal to selectively illuminate one of a plurality of character symbols of each of at least a portion of a plurality of key units of the keyboard device 100. Therefore, the keyboard device 100 of the present embodiment may selectively illuminate the specific character symbols on at least a portion of the plurality of key units of the keyboard device 100 according to the input mode currently operated in the computer device 200 so as to provide a diversified character symbol illumination effect.

In addition, other device features or implementation details of the keyboard device 100 and the computer device 200 of the present embodiment may be adequately taught, suggested, implemented and described with reference to the descriptions of the embodiments in FIGS. 1 to 6D, and thus the descriptions thereof are omitted herein.

Based on the above, the keyboard device and the operation method thereof of the present invention may dispose the plurality of light emitting components to one-to-one correspond to the plurality of character symbols of each of the plurality of key units of the keyboard device, and selectively drive the light emitting components according to the input mode currently operated in the computer device coupled to the keyboard device to selectively illuminate the specific character symbols on at least a portion of the key units of the keyboard device so as to provide a diversified character symbol illumination mode. Therefore, the keyboard device and the operation method thereof of the present invention may provide a diversified visual feedback effect and good user experience.

Although the present invention has been disclosed in the above embodiments, it is not intended to limit the present invention, and anyone of ordinary skill in the art may make several changes and embellishments without departing from the spirit and the scope of the present invention. Therefore, the protection scope of the present invention is defined by the scope of the appended claims.

What is claimed is:

1. A keyboard device, comprising:
   a drive circuit;
   a backlight module, coupled to the drive circuit; and
   a plurality of key units, disposed on the backlight module, wherein each of the plurality of key units comprises a key cap, a support and a plurality of character symbols corresponding to different input modes, the support is disposed between the key cap and the backlight module,
   wherein the drive circuit drives the backlight module according to the input mode to selectively illuminate one of the plurality of character symbols of at least a portion of the plurality of key units,
   wherein the backlight module comprises a plurality of light emitting components, a membrane layer, a base plate, a circuit protective layer and a circuit board, the membrane layer is disposed on the base plate, the base plate is disposed on the circuit protective layer, the circuit protective layer is disposed on the circuit board, and the plurality of light emitting components are disposed between the circuit protective layer and the circuit board.

2. The keyboard device according to claim 1, wherein the key cap comprises a plurality of light transparent areas, and the plurality of light transparent areas respectively correspond to the plurality of character symbols.

3. The keyboard device according to claim 1, wherein the plurality of light emitting components are respectively located below the plurality of key caps of the plurality of key units, and the plurality of light emitting components one-to-one correspond to the plurality of character symbols,
   wherein the drive circuit, according to the input mode, drives one of the plurality of light emitting components of each of at least a portion of the plurality of key units.

4. The keyboard device according to claim 1, wherein the backlight module is a direct backlight module,
   wherein the plurality of light emitting components are one-to-one disposed under the plurality of character symbols of the plurality of key units respectively.

5. The keyboard device according to claim 1, wherein the plurality of light emitting components of each of the plurality of key units are configured to respectively provide a plurality of illumination lights with different colors.

6. The keyboard device according to claim 1, wherein the backlight module further comprises a masking layer, and the masking layer is formed on at least a portion of the circuit protective layer.

7. The keyboard device according to claim 1, wherein the support comprises a scissor-mechanism configured to provide the elastic force to allow the key cap to move in a direction away from the backlight module.

8. The keyboard device according to claim 1, wherein the plurality of light emitting components are exposed from the membrane layer and the base plate.

9. The keyboard device according to claim 1, wherein the base plate has an opening, and at least one of the plurality of light emitting components is located inside the opening.

10. A keyboard device, comprising:
    a key unit, comprising a key cap and a support disposed under the key cap, wherein the key cap comprises a plurality of light transparent areas; and
    a backlight module, being disposed under the key unit and selectively illuminating one of the plurality of light transparent areas, wherein the backlight module comprises:
    a circuit board;
    a circuit protective layer, disposed on the circuit board;
    a plurality of light emitting components, disposed on and coupled to the circuit board;
    a base plate, disposed on the circuit protective layer, wherein the base plate has an opening corresponding to one of the light emitting components; and
    a masking layer, disposed on one side of the base plate, wherein the circuit protective layer is disposed between the masking layer and the circuit board.

11. The keyboard device according to claim 10, wherein one of the light emitting components is exposed from the masking layer.

12. The keyboard device according to claim 10, further comprising a membrane layer disposed on the base plate, wherein the base plate is disposed between the membrane layer and the masking layer.

* * * * *